United States Patent [19]

Ellard

[11] 4,246,358

[45] Jan. 20, 1981

[54] FIRE-RESISTANT MATERIAL AND PROCESS

[75] Inventor: James A. Ellard, Dayton, Ohio

[73] Assignee: Monsanto Research Corporation, St. Louis, Mo.

[21] Appl. No.: 103,977

[22] Filed: Dec. 17, 1979

Related U.S. Application Data

[60] Continuation of Ser. No. 571,820, Apr. 25, 1975, abandoned, which is a division of Ser. No. 408,952, Oct. 23, 1973, abandoned, which is a continuation of Ser. No. 205,409, Dec. 6, 1971, abandoned.

[51] Int. Cl.$^3$ ............................................... C08J 9/02
[52] U.S. Cl. ........................................ 521/77; 521/95; 521/128; 521/146; 521/147
[58] Field of Search ...................... 521/146, 77, 147

[56] References Cited

U.S. PATENT DOCUMENTS

| | | | |
|---|---|---|---|
| 3,748,173 | 7/1973 | Roth | 106/15 F |
| 3,759,741 | 9/1973 | Roth | 428/457 |

*Primary Examiner*—Morton Foelak
*Attorney, Agent, or Firm*—L. Bruce Stevens

[57] ABSTRACT

Fire-resistant organic materials including foams, are made by heating at temperatures sufficient to cause polymerization and elimination of nitrogen and sulfur precursor aromatic polymers having sulfonamide linkages and aromatic compounds capable of forming said polymers, e.g. sulfamyl-type aminoaromatic compounds such as sulfanilamide, sulfaguanadine and the like. Preferred compounds are those providing para linkages in the sulfonamide polymer chain, those which are substantially free of oxidizing substituents, for example nitro groups, and those which are not fused-ring aromatic. Preferred foams are the high expansion foams, i.e. those having expansion ratios of at least about 3:1, more preferably at least about 8:1. The precursors of these fire-resistant organic materials can be incorporated into polymers such as polyvinylidene chloride, polyisocyanates, aminoplasts, and the like either physically by mixing or by chemical reaction to give improved fire-resistance. Also inorganic fillers such as titanium dioxide, silica, alumina and the like can be added to the polymers and/or the precursor to give compositions having improved fire resistance.

22 Claims, No Drawings

FIRE-RESISTANT MATERIAL AND PROCESS

This is a continuation of application Ser. No. 571,820, filed Apr. 25, 1975, now abandoned; which is a division of application Ser. No. 408,952, filed Oct. 23, 1973, now abandoned; which is a continuation of application Ser. No. 205,409, filed Dec. 6, 1971, now abandoned.

BACKGROUND OF THE INVENTION

1. Field of the Invention

The field of the invention is fire-proofed compositions including foams and process for making.

2. Description of the Prior Art

In the August-September 1968, Sampe Journal, beginning on page 21, is an article on, "The Use of a Salt of p-Nitroaniline as a Component for Intumescence Coating", by John A. Parker, George M. Fohlen, Paul M. Sawko and Roy N. Griffin, Jr.

U.S. Pat. No. 3,535,130 issued Oct. 20, 1970, on "Intumescence Paints", relates to the same subject matter as the Sampe Journal article.

SUMMARY OF THE INVENTION

Fire-resistant organic materials including foams, are made by heating at temperature sufficient to cause polymerization and elimination of nitrogen and sulfur, precursor aromatic polymers having sulfonamide linkages and aromatic compounds capable of forming said polymers, e.g. sulfamyl-type aminoaromatic compounds such as sulfanilamide, sulfaguanidine and the like. Preferred compounds are those providing para linkage in the sulfonamide polymers chain, those which are substantially free of oxidizing substituents, for example nitro groups, and those which are not fused-ring aromatic. Preferred foams are the high expansion foams, i.e. those having expansion ratios of at least about 3:1, more preferably at least about 8:1. The precursors of these fire-resistant organic materials can be incorporated into polymers such as polyvinylidene chloride, polyisocyanates, aminoplasts, and the like either physically by mixing or by chemical reaction to give improved fire-resistance. Also inorganic fillers such as titanium dioxide, silica, alumina and the like can be added to the polymers and/or the precursor to give composition having improved fire resistance.

DESCRIPTION OF THE PREFERRED EMBODIMENTS

Compounds useful in the process of the invention to make fire-resistant materials of the invention are shown in Table I with an asterisk (*) opposite them, and Table I in addition has data on other compounds not of the invention for comparison. These compounds of the invention are merely illustrative of a variety of compounds actually tested in making fire-resistant materials. Polymeric sulfonamides useful in the process of the invention are described in U.S. Pat. No. 2,321,891, for example, para-benzene disulphonyl chloride, page 2, column 1, line 57, can be reacted with paraphenylenediamine, line 72, to give polymeric sulfonamides useful in the process of the invention.

Heating compositions of the invention may be accomplished in air or in inert atmospheres, by whatever method desired, including open flames. Some of the compositions will flame briefly during foam generation, but the flames are quickly extinguished as the reaction progresses. Many compositions melt before the onset of foaming. The liquid range may be shortened, and the temperature at which foaming begins may be reduced by small additions of compounds which react at lower temperatures, such as benzenesulfonhydrazides. The onset of foaming is accompanied by darkening, gas evolution, and formation of a black thermoplastic low expansion foam, which may be cooled to a brittle solid for later activation if desired. On further heating, the thermoplastic foam expands further and sets to a low density fire resistant foam containing most of the carbon of the initial composition in a form which decomposes very slowly under prolonged heating in inert atmospheres at temperatures up to 960° C., and which oxidizes very slowly in diffusion flames.

TABLE I

| Compound or Mixture | Melt Range, °C. | Plastic Range, °C. | Burning Observed | Expansion Ratio | Yield, Wt. % | Glowing in Flame | After Glow | Stability in Flame |
|---|---|---|---|---|---|---|---|---|
| *Sulfaguanidine | 193–320 | 320–60 | none | 20:1 | 45 | none | none | excellent |
| *N-Acetylsulfanilyl chloride | | | none | v high | 40 | none | none | excellent |
| *Sulfanilamide | 165–320 | 320–60 | some | 30:1 | 42 | none | none | excellent |
| *N-Sulfanilylacetamide | | | much | high | 34 | none | none | excellent |
| *Sulfaguanidine-Sulfanilamide, 1:1 mix | 165–320 | 320–60 | slight | 25:1 | 47 | none | none | excellent |
| *N-Acetylsulfanilylchloride-sulfanilamide, 1:1 mix | 165–320 | 320–60 | slight | 20:1 | 49 | none | none | excellent |
| *Sulfanilamide-Sulfanilic acid, 1:1 mix | 165–265 | 285–350 | slight | 30:1 | 43 | v slight | none | v good |
| *Sulfanilamide-Sulfanilic acid, 1:2 mix | none | | slight | 20:1 | 35 | slight | slight | good |
| Sulfanilic acid | none | none | none | none | high | severe | ashes | slight |
| 4,4'-Sulfonyldianiline | 175–300 | 300–60 | much | 2:1 | low | none | none | v good |
| 4,4'-oxybis(benzenedisulfonyl-hydrazide) | 195–200 | nil | much | 10:1 | low | none | none | v good |
| *2-Amino-4-chlorobenzenesulfonamide | | | some | 10:1 | 25 | some | slight | good |
| 4-Nitroaniline bisulfate | 185–95 | 215–20 | slight | 10:1 | 30 | some | slight | fair |
| 2-Amino-1-Napthalenesulfonic acid | none | none | some | 2:1 | | some | slight | fair |
| Taurine (2-aminoethanesulfonic acid) | nil | slight | none | 10:1 | fair | some | slight | poor |
| Telomers Prepared by Interfacial Condensation | | | | | | | | |
| *4,4'-biphenyldisulfonyl chloride + 4,4'-Sulfonyl-dianiline | 150–170 | 290 | slight | low | good | none | none | excellent |
| *4,4'-biphenyldisulfonyl | | | | | | | | |

TABLE I-continued

| | | | | | | | |
|---|---|---|---|---|---|---|---|
| chloride + p-phenylene diamine | none | none | slight | none | good | none | none | excellent |
| *m-Benzenedisulfonyl chloride + m-phenylenediamine | 175–80 | | slight | none | good | some | some | poor |
| *m-Benzenedisulfonyl chloride + 4,4'-sulfonyldianiline | | | yes | 3:1 | good | some | some | poor |

Two Component Systems Reacted by Melting Together in a Spatula Before Burning

| Aniline or Phenol | Acid or Acid Chloride | Foam Yield | Glowing in Flame | After Glow | Stability in Flame |
|---|---|---|---|---|---|
| *4,4'-Sulfonyldianiline | 4,4'-Biphenyldisulfonyl chloride | 10:1 | none | none | excellent |
| *3,5-Dibromo-4-hydroxyaniline | 4,4'-Biphenyldisulfonyl chloride | 20:1 | none | none | excellent |
| 4,4'-Dihydroxydiphenylsulfone | 4,4'-Biphenyldisulfonyl chloride | 4:1 | slight | none | v good |
| 4,4'-Dihydroxydiphenylsulfone | 3,3'-Sulfonylbis(benzenesulfonyl chloride) | 2:1 | slight | none | v good |
| 4,4'-Dihydroxydiphenylsulfone | m-Benzenedisulfonylchloride | 1:1 | slight | none | v good |
| *Benzidine | Sulfamide | 20:1 | none | none | excellent |
| *Benzidine | Sulfamic Acid | 5:1 | none | none | excellent |
| *Benzidine | m-Benzenedisulfonyl Chloride | 20:1 | slight | slight | good |
| *Benzidine | 3,3'-Sulfonylbis(benzenesulfonyl chloride) | 20:1 | slight | none | v good |
| *Sulfanilic Acid | Sulfamide | 20:1 | none | none | excellent |
| *Metanilic Acid | Sulfamide | 10:1 | severe | slight | fair |
| *3,3'-Sulfonyldianiline | m-Benzenedisulfonyl Chloride | 3:1 | slight | none | good |

*Compounds of the invention

Table II contains elemental analysis from experiments of heating sulfanilamide and sulfaguanidine with samples being taken and analyzed at several different stages of foam development.

TABLE II

ANALYSIS OF FOAMS AND PRECURSORS

| | %C | %H | %N | %S | %O |
|---|---|---|---|---|---|
| Sulfanilamide | 41.84 | 4.68 | 16.27 | 18.62 | 18.58 |
| 1st Stage Foam[1] Upper Surface | 39.51 | 3.71 | 11.03 | 18.61 | 27.14 |
| Lower Layer | 56.35 | 3.22 | 13.73 | 14.25 | 12.45 |
| 2nd Stage Foam[2] | 54.40 | 2.99 | 12.77 | 14.85 | 14.99 |
| 2nd Stage Foam (after heating)[3] | 63.37 | 1.07 | 9.34 | 5.12 | 21.1 |
| Sulfaguanidine | 39.24 | 4.70 | 26.15 | 14.97 | 14.94 |
| 1st Stage Foam[4] | 45.17 | 3.87 | 23.67 | 13.76 | 13.53 |
| 2nd Stage Foam[5] | 49.67 | 3.03 | 21.26 | 12.21 | 13.83 |

[1]44% weight loss, heated in a beaker on the hotplate to 360° C.
[2]After reheating to thermoset stage in flame. 58% weight loss
[3]Surface sample after roasting 5 min. in Meeker burner flame.
[4]Heating to 360°, 31% weight loss.
[5]Flame heating of 1st stage, 48% weight loss.

Table III contains foam yields, oxidation rates and thermal stability data obtained using thermogravimetric apparatus on four different compounds useful in process of the invention. This table is a summary of TGA runs on each of the compounds, separate runs for each compound being made in air and in helium atmosphere, at heating rates of 2.7–2.8° C./minute.

Table IV contains elemental analysis of 960° C. residues in helium referred to in Table III. It appears from the analyses that sulfur and nitrogen containing fragments are responsible for the vapor phase which creates the foamed structure.

Table V reports insulation tests on certain sulfanilamide foams. For these tests 4"×4" panels of ⅜" plywood were drilled to accept an iron-constantan thermocouple introduced from the center of the unexposed face to position the junction just flush with the exposed face. Fire-resistant foams were then generated on the exposed surfaces by heating the precursor with an open flame. The foams were measured, and evaluated by

TABLE III

FOAM YIELDS AND OxIDATION RATES OF FIRE-RESISTANT FOAMS

| | Final Residue in He @ 960° C. | Oxidation of Foams Generated and Heated in Air | | |
|---|---|---|---|---|
| Foams Derived From | | T, Residue When Oxidation Began* | Max. Oxidation Rate @ T, °C. | Oxidation Completed |
| Sulfaguanidine | 29.7% | 420° C. @ 51% | 0.81%/min., 550 | 660° C. |
| Sulfanilamide | 33.9% | 350° C. @ 52.5% | 0.77%/min., 500 | 640° C. |
| N-Acetylsulfanilyl Chloride | 34% | 340° C. @ 56% | 0.85%/min., 475 | 600° C. |
| N-Sulfanilylacetamide | 28.8% | 335° C. @ 49% | 0.73%/min., 485 | 630° C. |

*Weight losses during melting, thermoplastic foaming and thermoset foaming were identical in air and in helium to the temperature and residue shown. The samples in helium then showed a slow, nearly linear weight loss to the 960° C. temperature limit, while the samples in air were consumed by slow oxidation.

TABLE IV

ANALYSIS OF 960° C. RESIDUES OF FIRE-RESISTANT FOAMS

| Compound Used to Generate the Foam | %C | %H | %O[1] | %N | %S | Ratio |
|---|---|---|---|---|---|---|
| Sulfanilamide | 72.89 | 1.65 | 13.73 | 4.36 | 7.23 | $C_6H_{1.63}O_{0.85}N_{0.31}S_{0.22}$ |
| Sulfaguanidine | 75.80 | 1.63 | 9.87 | 6.86 | 5.84 | $C_6H_{1.55}O_{0.58}N_{0.47}S_{0.17}$ |
| N-acetylsulfanilyl Chloride | 76.33 | 1.64 | 12.53 | 6.44 | 3.06 | $C_6H_{1.55}O_{0.74}N_{0.44}S_{0.09}$ |
| N-sulfanilylacetamide | 80.22 | 1.50 | 10.47 | 5.05 | 2.76 | $C_6H_{1.34}O_{0.59}N_{0.32}S_{0.09}$ |

[1]Oxygen determined by difference direct impingement of the 1200° C. flame from a propane torch placed 2" from the surface of the foam. The time for the thermocouple to reach 400° F. was measured, as was the extent of erosion. The initial foam heights ranged from 11/16" 1 to 1⅛", so the heating times were normalized on the basis of the initial foam height (seconds required to reach 400° F. per inch of initial thickness).

TABLE V

| INSULATIVE TESTS ON FOAMS | | |
|---|---|---|
| Foam Generated From | Time to 400° F. (sec./inch) | Erosion Rate (mils./sec.) |
| Sulfanilamide | 267 | 1.87 |
| Sulfaguanidine | 309 | 2.31 |
| Sulfanilamide + 10% TiO$_2$ | 400 | 0.22 |

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly modifications are contemplated which can be made without departing from the spirit of the described invention.

What I claim is:

1. A fire-resistant material made
  (a) by heating at temperatures sufficient to cause polymerization monomeric aromatic compounds capable of forming aromatic polymers substantially free of oxidizing substitutents having sulfonamide linkages, and heating said aromatic polymers at temperatures greater than about 285° C., which temperatures may be reduced by small additions of benzenesulfonhydrazides which react at lower temperatures, sufficient to cause elimination of nitrogen and sulfur; or
  (b) by heating aromatic polymers substantially free of oxidizing substitutents having sulfonamide linkages at temperatures greater than about 285° C., which temperatures may be reduced by small additions of benzenesulfonhydrazides which react at lower temperatures sufficient to cause elimination of nitrogen and sulfur.

2. A material of claim 1 wherein said component has para linkages.

3. A material of claim 1 which is a foam having an expansion ratio of at least about 8:1.

4. A material of claim 1 wherein said component is non-fused ring aromatic.

5. A material of claim 1 wherein said component is a sulfanyl-type aminoaromatic compound.

6. A material of claim 1 wherein said component is a polymeric aromatic sulfonamide.

7. A material of claim 1 wherein said component is sulfanilamide.

8. A material of claim 1 wherein said component is sulfaguanidine.

9. A material of claim 1 wherein said component is about an equimolar mix of sulfanilamide and sulfanilic acid.

10. A material of claim 1 wherein said component is about an equimolar mix of 4,4'-biphenyldisulfonyl chloride and p-phenylene diamine.

11. A material of claim 1 wherein said component is about an equimolar mix of 4,4'-sulfonyldianiline and 4,4'-biphenyldisulfonyl chloride.

12. A process for making fire-resistant material comprising
  (a) heating at temperatures sufficient to cause polymerization monomeric aromatic compounds capable of forming aromatic polymers substantially free of oxidizing substituents having sulfonamide linkages, and heating said aromatic polymers at temperatures greater than about 285° C., which temperatures may be reduced by small additions of benzenesulfonhydrazides which react at lower temperatures, sufficient to cause elimination of nitrogen and sulfur; or
  (b) heating aromatic polymers substantially free of oxidizing substituents having sulfonamide linkages at temperatures greater than about 285° C., which temperatures may be reduced by small additions of benzenesulfonhydrazides which react at lower temperatures, sufficient to cause elimination of nitrogen and sulfur.

13. A process of claim 12 wherein said component has para linkages.

14. A process of claim 12 wherein said material is a foam having an expansion ratio of at least about 8:1.

15. A process of claim 12 wherein said component is non-fused-ring aromatic.

16. A process of claim 12 wherein said component is a sulfanyl-type aminoaromatic compound.

17. A process of claim 12 wherein said component is a polymeric aromatic sulfonamide.

18. A process of claim 12 wherein said component is sulfanilamide.

19. A process of claim 12 wherein said component is sulfaguanidine.

20. A process of claim 12 wherein said component is about an equimolar mixture of sulfanilamide and sulfanilic acid.

21. A process of claim 12 wherein said component is about an equimolar mixture of 4,4'-biphenyldisulfonyl chloride and p-phenylene diamine.

22. A process of claim 12 wherein said component is about an equimolar mixture of 4,4'-sulfonyldianiline and 4,4'-biphenyldisulfonyl chloride.

* * * * *